United States Patent
Bieler et al.

(10) Patent No.: US 10,232,906 B2
(45) Date of Patent: Mar. 19, 2019

(54) ELECTRICALLY ASSISTED STREET SCOOTER

(75) Inventors: Thierry Bieler, Echichens (CH); Laurent Cardoletti, Villeneuve (CH); Christian Fleury, Cotterd (CH); Christian Koechli, Yvonnand (CH); Simon Tinguely, Lausanne (CH)

(73) Assignee: MICRO-BEAM SA, Yverdon-les-Bains (CH)

( * ) Notice: Subject to any disclaimer, the term of this patent is extended or adjusted under 35 U.S.C. 154(b) by 0 days.

(21) Appl. No.: 14/122,621

(22) PCT Filed: May 24, 2012

(86) PCT No.: PCT/EP2012/059686
§ 371 (c)(1),
(2), (4) Date: Feb. 12, 2014

(87) PCT Pub. No.: WO2012/163789
PCT Pub. Date: Dec. 6, 2012

(65) Prior Publication Data
US 2014/0196968 A1 Jul. 17, 2014

(30) Foreign Application Priority Data
May 27, 2011 (CH) ........................................ 0913/11

(51) Int. Cl.
*B62M 6/00* (2010.01)
*B62M 6/65* (2010.01)
(Continued)

(52) U.S. Cl.
CPC ................. *B62M 6/00* (2013.01); *B62H 5/00* (2013.01); *B62H 5/08* (2013.01); *B62M 6/65* (2013.01); *B62K 3/002* (2013.01)

(58) Field of Classification Search
CPC .. B60K 3/002; B60K 2202/00; B60K 7/0007; B62M 6/40; B62M 6/45; B62M 6/50; B62M 6/60; B62M 6/90
(Continued)

(56) References Cited

U.S. PATENT DOCUMENTS 5,730,243 A * 3/1998 Koike et al. .................. 180/220
5,775,452 A 7/1998 Patmont
(Continued)

FOREIGN PATENT DOCUMENTS

DE 100 53 043 A1 9/2001
DE 10053043 A1 * 9/2001 ............ B62M 23/02
(Continued)

OTHER PUBLICATIONS

European Office Action dated Feb. 1, 2016 as received in Application No. 12726765.6.

*Primary Examiner* — Katy M Ebner
(74) *Attorney, Agent, or Firm* — Maschoff Brennan (57) ABSTRACT

An electrically assisted street scooter includes a handlebar, a deck, front and back wheels, a battery pack integral with the deck, an electrical motor for driving at least one of the wheels, and a drive circuit for controlling electrical supply to the electrical motor from the battery pack. The drive circuit includes a switch for setting the drive circuit in a low power-mode where the electrical motor is not powered when the switch is off, or for setting the drive circuit in a drive mode where the electrical motor can be powered when the switch is on. An auto-power on circuit automatically switches the switch on when a user pushes the street scooter. An auto-power off circuit automatically switches the switch off when the scooter is not used during a predetermined duration. The level of electrical assistance is determined based on the peak value after each leg push.

19 Claims, 4 Drawing Sheets

(51) Int. Cl.
  *B62H 5/00* (2006.01)
  *B62H 5/08* (2006.01)
  *B62K 3/00* (2006.01)

(58) Field of Classification Search
  USPC .......................................... 180/180, 181, 220
  See application file for complete search history.

(56) References Cited

U.S. PATENT DOCUMENTS

| | | | | |
|---|---|---|---|---|
| 5,848,660 | A * | 12/1998 | McGreen | 180/220 |
| 5,912,545 | A * | 6/1999 | Monet et al. | 320/107 |
| 5,991,505 | A * | 11/1999 | Frank | 388/828 |
| 6,095,274 | A * | 8/2000 | Patmont | 180/181 |
| 6,144,125 | A * | 11/2000 | Birkestrand et al. | 310/68 B |
| 6,227,324 | B1 * | 5/2001 | Sauve | 180/228 |
| 6,318,491 | B1 | 11/2001 | Tung | |
| 6,341,660 | B1 * | 1/2002 | Schiller | 180/220 |
| 6,343,667 | B2 * | 2/2002 | Sauve | 180/228 |
| 6,347,681 | B1 * | 2/2002 | Patmont et al. | 180/220 |
| 6,394,213 | B1 * | 5/2002 | Tsai | 180/181 |
| 6,431,302 | B2 * | 8/2002 | Patmont et al. | 180/228 |
| 6,462,493 | B2 * | 10/2002 | Lan | 318/272 |
| 6,619,416 | B2 * | 9/2003 | Lan | 180/181 |
| 6,634,452 | B2 * | 10/2003 | Cheng et al. | 180/220 |
| 6,832,660 | B2 * | 12/2004 | Dodd | 180/220 |
| 7,040,443 | B1 * | 5/2006 | Roth et al. | 180/221 |
| 7,573,213 | B2 * | 8/2009 | Chiu et al. | 318/106 |
| 8,596,652 | B2 * | 12/2013 | Tong et al. | 280/47.19 |
| 8,776,936 | B2 * | 7/2014 | Mimura et al. | 180/291 |
| 2002/0029918 | A1 * | 3/2002 | Patmont et al. | 180/220 |
| 2002/0088659 | A1 * | 7/2002 | Wong | 180/220 |
| 2002/0096380 | A1 * | 7/2002 | Lai | 180/181 |
| 2002/0108798 | A1 | 8/2002 | Huntsberger | |
| 2002/0148663 | A1 * | 10/2002 | Chang | 180/210 |
| 2002/0170763 | A1 * | 11/2002 | Townsend | 180/220 |
| 2003/0015976 | A1 * | 1/2003 | Chen | 318/9 |
| 2003/0037980 | A1 * | 2/2003 | Chen | 180/220 |
| 2003/0168273 | A1 * | 9/2003 | Ducharme et al. | 180/181 |
| 2003/0221888 | A1 * | 12/2003 | McKinney et al. | 180/181 |
| 2004/0026144 | A1 * | 2/2004 | Lan | 180/180 |
| 2004/0050603 | A1 * | 3/2004 | Jaeger | 180/181 |
| 2004/0055803 | A1 * | 3/2004 | Patmont | 180/181 |
| 2006/0266570 | A1 * | 11/2006 | Roth et al. | 180/208 |
| 2007/0175685 | A1 * | 8/2007 | Tserng | 180/180 |
| 2012/0232734 | A1 * | 9/2012 | Pelletier | A63C 17/12 701/22 |

FOREIGN PATENT DOCUMENTS

| | | | | |
|---|---|---|---|---|
| FR | 2949689 | A1 * | 3/2011 | ............ A63C 17/12 |
| WO | 98/46474 | A2 | 10/1998 | |
| WO | 98/46475 | A2 | 10/1998 | |
| WO | 01/115967 | A1 | 3/2001 | |
| WO | 02/098724 | A1 | 12/2002 | |
| WO | 2010/50236 | A2 | 12/2010 | |
| WO | 2010/150236 | A2 | 12/2010 | |
| WO | 2010/150237 | A1 | 12/2010 | |
| WO | 2010/150238 | A1 | 12/2010 | |
| WO | 2011/008891 | A1 | 1/2011 | |

* cited by examiner

ELECTRICALLY ASSISTED STREET SCOOTER

The present invention relates to a leg propelled street scooter with electrical assistance. The present invention applies in particular to foldable microscooter with electrical assistance, and to a scooter that could be used for instance by commuters using public transportation to allow them reaching public transport from home/office with no time loss.

RELATED ART

Electric powered scooters are known. More particularly, an electric scooter is disclosed in U.S. Pat. No. 5,775,452. This document suggests batteries held to the underside of the platform or deck of the scooter. A motor directly drive the rear wheel when a switch on the steering handle is actuated. This document relates to an electric powered scooter, which is essentially or only powered by the motor; in fact it might be difficult or even dangerous to push the scooter with one leg when the motor is switched on, since one needs to adapt the leg push to the speed determined by the motor.

U.S. Pat. No. 6,318,491 relates to an electric scooter having a friction wheel which can be pressed against the rear wheel to drive or brake this wheel. Again, adaptation of the leg push to the speed given by the motor is difficult.

WO0183287 describes an electrically powered scooter with a pedal for pushing a driving friction wheel against the rear wheel.

U.S. Pat. No. 6,619,416 describes an electric scooter having a brake lever. When the user moves the scooter and the moving speed of the scooter reaches a predetermined level, the motor is switched on. A drawback is that no electric assistance is provided when the scooter is pushed until the threshold speed has been reached. A further drawback is that once the motor has been started the speed of the scooter is almost independent of the efforts made by the user. If the threshold speed is too low, the motor can be inopportunely started, for example when a user walks and pushes his scooter beside him.

US2002/0170763 describes an electric scooter where the speed can be controlled with a switch on the steering handle. Again, a user who wants to assist the motor by pushing with his leg could be surprised by the speed of the scooter.

WO02098724 describes an electric push-type scooter having a drive pinion which is peripherally engageable with the wheel of the scooter.

WO2008090309 discloses a foot-propelled microscooter having a brake light controlled by a foot operated brake member. This scooter uses a switch biased into contact with the brake member.

WO9846475 relates to a portable collapsible motorized or non-motorized scooter. The motorized scooter comprises a motor which is switched on when a power-on switch is pressed and when the wheel is rotated at a sufficient speed.

WO10150236 describes a method for controlling the sped of an electric scooter, wherein the real speed of the scooter is compared with a target speed and the driving motor is then operated so as to approach the target speed by means of a PID controller. This solution thus requires an accelerator control, such as a rotatable hand grip, for setting the target speed. The target speed is independent from any efforts made by the user when he pushes with his leg.

WO10150237 describes another electric scooter in which the electronic system maintains the electric motor of the scooter immobile when the scooter is immobile for a given period of time.

WO10150238 describes another electric scooter in which an electronic braking system is switched as a generator when the pressure in the hydraulic circuit of a hydraulic brake system reaches a predetermined level, so as to recharge the battery pack and generate a braking torque.

WO2011008891 describes an electric scooter having photovoltaic cells on the platform for charging the batteries.

WO2011145125 discloses a scooter having a platform comprising at least one space for lodging a battery.

SUMMARY OF THE INVENTION

There is a need for an improved electric assisted scooter which avoids or at least mitigates the drawback of the electric scooter of the prior art.

In particular, there is a need for an electric assisted scooter which is easier, more intuitive and less dangerous to drive.

There is also a need for an electric assisted scooter with a higher autonomy and in which the power consumption is reduced.

According to one aspect, the invention thus relates to an electrically assisted street scooter comprising:
 a handlebar
 a deck
 at least one front wheel
 at least one rear wheel
 a battery pack integral with said deck;
 at least one electrical motor for driving at least one of said wheels;
 a drive circuit for controlling electrical supply to said electrical motor from said battery pack,
 wherein the drive circuit comprises:
  a switch for setting said drive circuit in a low power-mode where said electrical motor is not powered when the switch is off, or for setting said drive circuit to a drive mode where said electrical motor can be powered when the switch is on,
  an auto-power on circuit for automatically switching said switch on when a user pushes said street scooter;
  an auto-power off circuit for automatically switching said switch off when the scooter is not used during a predetermined duration.

This has the advantage that the drive circuit for the electric motor is automatically switched on when the scooter is pushed.

This has the further advantage that the drive circuit for the electric motor is automatically switched off when the scooter is not used during a predetermined duration. This results in battery saving.

Therefore, it is possible to build an electrically assisted scooter without any hand- or foot-operated switch for switching the scooter on or off.

The detection that a user pushes a scooter might be independent from the speed of the scooter. For example, a scooter can be made in which the motor is not switched on at high speed if this high speed is not caused by a leg push. It is also possible to build a scooter in which the motor will be switched on at any speed, including low speeds, if this speed results from a leg push.

The switch might selectively connect or disconnect the drive circuit and the battery pack. In another embodiment, the switch might selectively set the drive circuit into a low power mode without entirely disconnecting the drive circuit from the battery pack.

The drive circuit might detect leg pushes even when it is in low power mode. The drive circuit might constantly monitor the speed of the scooter or the rotational speed of one wheel when it is in low power mode.

The drive circuit might have a plurality of low power modes. The drive circuit might have a first low power mode in which a speed is constantly monitored for detecting leg pushes, and a second low power mode in which this speed is not monitored and in which leg pushes are not detected. The drive circuit might switch from the first low power mode to the second low power mode after a predetermined time. The drive circuit might switch from the second low power mode to the first low power mode when a voltage higher than a threshold has been generated by the motor and generator, or when an acceleration has been detected by an accelerometer.

The auto-power on part of the drive circuit might be driven by the electrical motor working as a generator and/or by the battery pack. A rectifier might be used for rectifying the signal provided by the electrical motor in order to provide a DC supply voltage to the auto-power-on circuit.

When a user pushes a scooter with his leg, the scooter reaches a maximal, peak speed usually when or shortly after the pushing leg leaves the ground. After this peak, the speed slowly decreases until the next leg push. The drive circuit might reduce the decrease of speed of the street scooter after the maximal speed has been reached each time a user pushes the street scooter with his leg. This method of controlling the speed thus simulates a street scooter that runs with low friction and/or a street scooter that runs on a lower street slope.

According to one possibly independent aspect of the invention, the electrically assisted scooter might comprise one brake pedal and at least one sensor for detecting the instantaneous position of the brake pedal. The sensor generates a signal which can take more than two different values depending on the position of the brake pedal. The drive circuit controls the braking torque applied by the electric motor and generator in function of the present and past position of the brake. The energy produced by the generator when the brake is activated can be used for charging the battery pack of the electric scooter, and/or dissipated when the battery is full.

A same brake pedal might control the sensor for braking the scooter with the motor/generator, and for braking the scooter by applying friction on the wheel when it is activated with a larger motion of the brake.

The scooter might comprise a speed and/or position detection unit for detecting the rotation speed and/or position of the wheel within which the electrical motor is mounted. This detection unit preferably uses a sensorless technology.

The motor phases might be powered in function of the position of the rotor.

The drive circuit might determine the level of electrical powering of the scooter as a function of the rotational speed of the wheel determined by the detection unit.

An accelerometer might be used for switching the electrical motor on or off and for determining the level of electrical powering based on the output signal of the accelerometer.

According to one aspect of the invention, which is possibly independent from the other aspects, the drive circuit might distinguish between a first phase of acceleration of the street scooter when the user pushes it with his leg, and another, third phase of deceleration of the street scooter due to friction and/or street slope. The drive circuit might adjust the electrical powering assistance as a function of the speed determined during the first phase.

The electric scooter might distinguish between a second phase of fast deceleration when the user pulls the handle bar to recenter his body after he pushed the street scooter, and a third phase of slower deceleration due to friction and street slope.

The drive circuit might determine a set speed as a function of the peak speed reached after a push leg.

The drive circuit might determine a set speed as a function of the speed reached during or immediately after detection of a quick speed decrease due to recentering of the user's body.

The drive circuit might differentiate a rotation of the wheel due to leg push from rotations due to other activities for which the electrical powering should not be activated.

The drive circuit might comprise a speed sensing circuit for sensing the speed of said scooter, and a discriminating module for differentiating between motion caused by leg push from other motions, wherein the differentiation is based on a speed profile.

The drive circuit might cancel electrical powering when the speed is below a first threshold and/or when no leg push is detected, thus allowing a user to walk while pushing its scooter on its side.

The drive circuit might cancel electrical powering when the current supplied to the electrical motor at a given speed is lower than a predetermined threshold. This indicates that the torque applied to the wheel is very low, for example when the user is driving downhill or when the driving wheel does not contact the ground and rotates in the air.

The drive circuit might cancel or reduce electrical powering when the speed is above a second threshold. The drive circuit might control the motor to act as a generator and brake the scooter when the speed is above a third threshold.

The drive circuit might brake the electrical motor when the user has not been identified.

The electrical circuit might comprise a controller for executing a computer program in order to determine the level of electrical powering to apply as a function of the history of measured speed.

The invention also relates to a method for driving an electrical street scooter, comprising a step of automatically switching a switch between a battery pack and an electrical motor on or a step of automatically disabling at least one low power mode when a user pushes said street scooter.

According to another aspect, the invention further relates to an electrically assisted street scooter comprising:
  a handlebar;
  a deck;
  at least one front wheel;
  at least one rear wheel;
  a battery pack;
  at least one electrical motor for driving at least one of said wheels;
  a drive circuit for controlling electrical supply to said electrical motor from said battery pack;
  wherein the drive circuit comprises:
  a speed sensing circuit for sensing the speed of said scooter, and a discriminating module for differentiating, based on a speed profile, between motion caused by leg push and other motions.

According to another aspect, the invention further relates to an electrically assisted street scooter comprising:

a handlebar;
a deck;
at least one front wheel;
at least one rear wheel;
a battery pack;
at least one electrical motor for driving at least one of said wheels;
a drive circuit for controlling electrical supply to said electrical motor from said battery pack;
a brake pedal for braking said rear wheel by friction;
a sensor for generating a signal representative of the position of said brake pedal, wherein said signal can take more than two different positions;
wherein the drive circuit is arranged for controlling said electrical motor so as to apply to said rear wheel a braking torque depending on said signal when said brake pedal is pressed.

SHORT DESCRIPTION OF THE FIGURES

The present invention will be better understood with the detailed description of some possible embodiments illustrated by the figures in which.

EXAMPLE OF EMBODIMENT OF THE INVENTION

Figure 1:
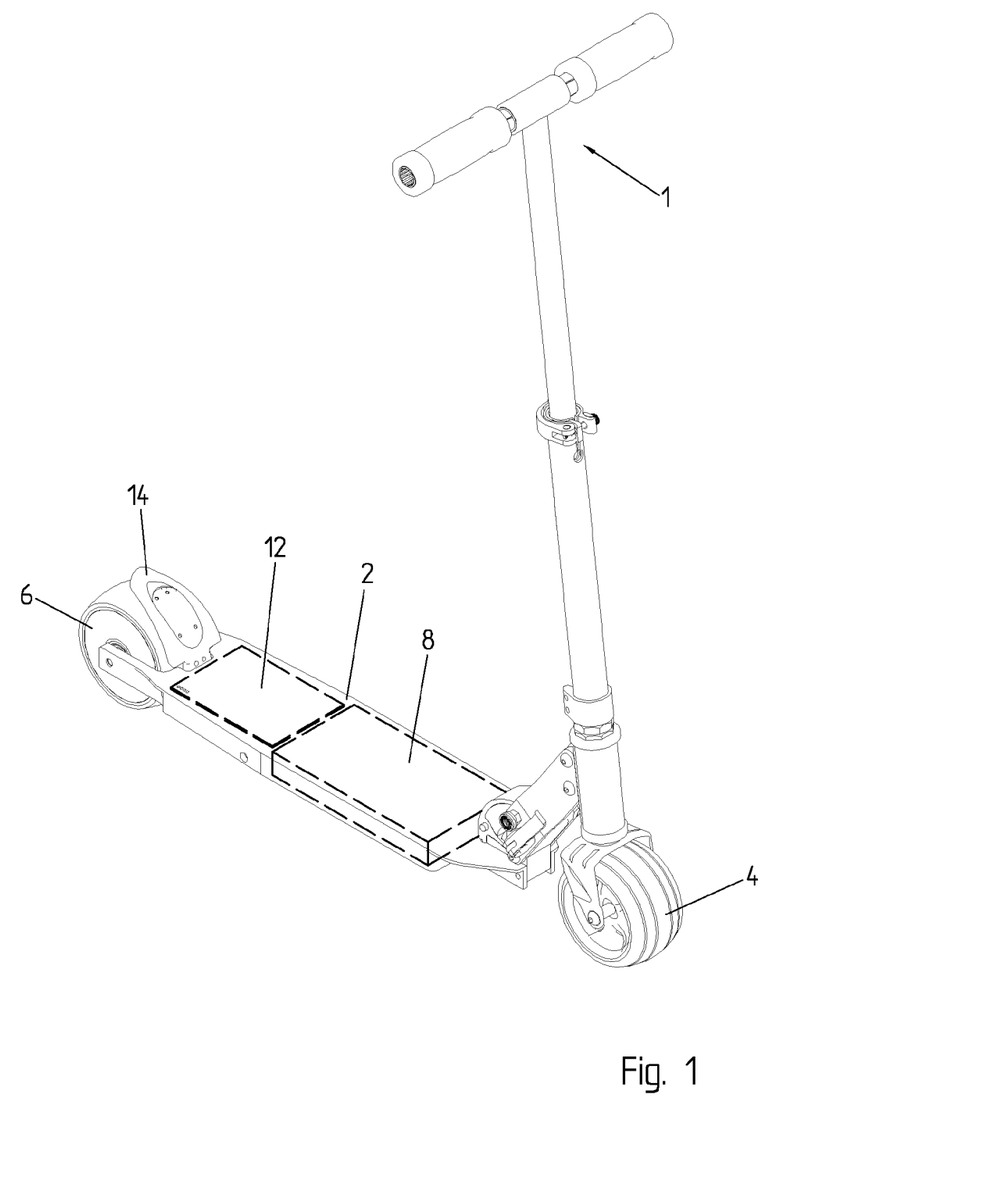
FIG. 1 is a side elevational view showing a portable, foldable electric street scooter in unfolded position.

The street scooter of FIG. 1 comprises a deck (or platform 2), a handle bar 1, a front wheel 4 and a rear wheel 6. The deck is preferably made of aluminium. The street scooter is preferably a foldable microscooter, for example a foldable microscooter, although the different aspects of the invention could also be applied to other types of street scooters, including non foldable scooters or skateboards.

Figure 2:
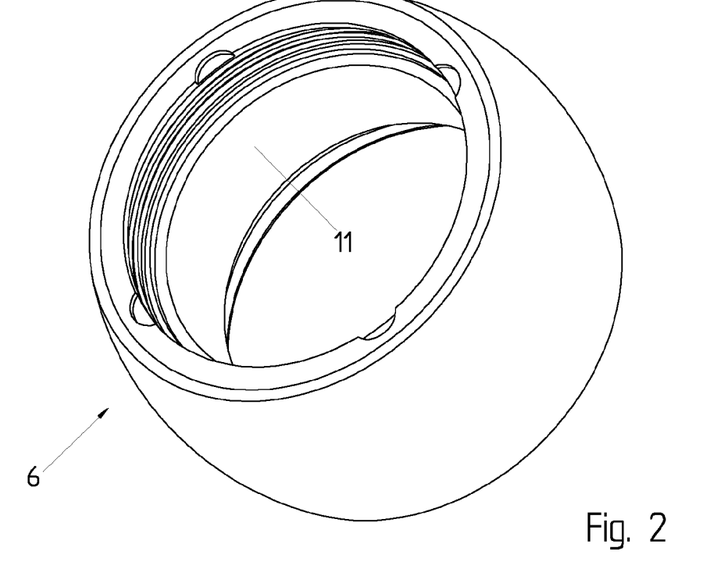
FIG. 2 is a view of the rotor of the electric motor that drives the scooter of FIG. 1.
Figure 3:
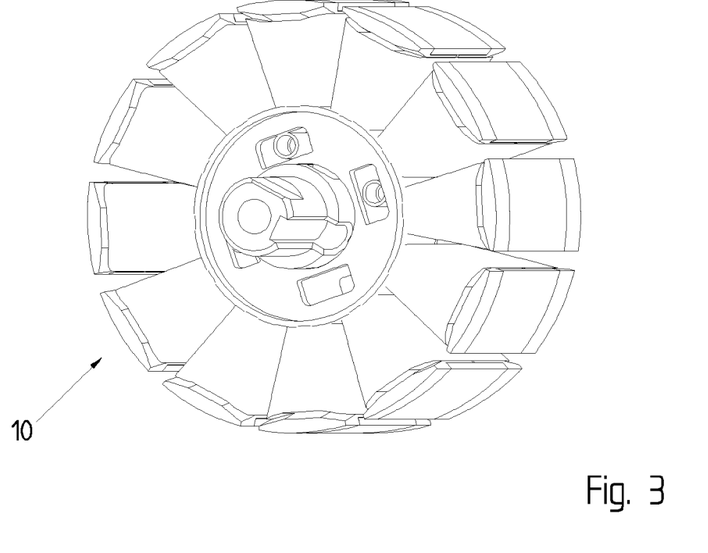
FIG. 3 is a view of the stator of the electric motor that drives the scooter of FIG. 1.

An electrical motor fits in one of the wheels, for example in the rear wheel (FIGS. 2 and 3) of the street scooter. The motor could be a brushless DC motor, or another DC motor. It comprises a central stator 10 with coils and permanent magnets within the external rotor 11. In this example, the motor has been mounted within the rear wheel but could have been mounted within the front wheel 4; furthermore, it is also possible to mount a motor within both two wheels. In one embodiment, the front wheel and/or the rear wheel can be doubled (front built with 2 wheels and/or rear built with 2 wheels) and a motor can be mounted within at least one of the rear wheels and/or within one of the front wheels. The motor could possibly be built outside of the wheel, for example on an axis of the wheel.

The motor driver uses a sensorless position and/or rotation speed detection unit as described in Swiss Patent Application CH701063 or in International Application WO2011023792. A speed sensing module 1220 executed by a microcontroller 122 (FIG. 8) then determines the current speed of the scooter or rotational speed of the driving wheel from electric signals in the motor driver 123. A position and/or speed sensor mounted on the motor and/or wheel could be used instead of a sensorless technology. The speed of the scooter could also be determined with an inertial sensor, for example an accelerometer. The information on position of the rotor 11 can be used for the powering of the motor phases in an optimal way in function of the rotor position without position sensor. As we will see, the information on rotation speed and/or speed variation is also used by the algorithms for calculating and controlling the level of electrical assistance provided at each instant to the scooter.

Figure 4:
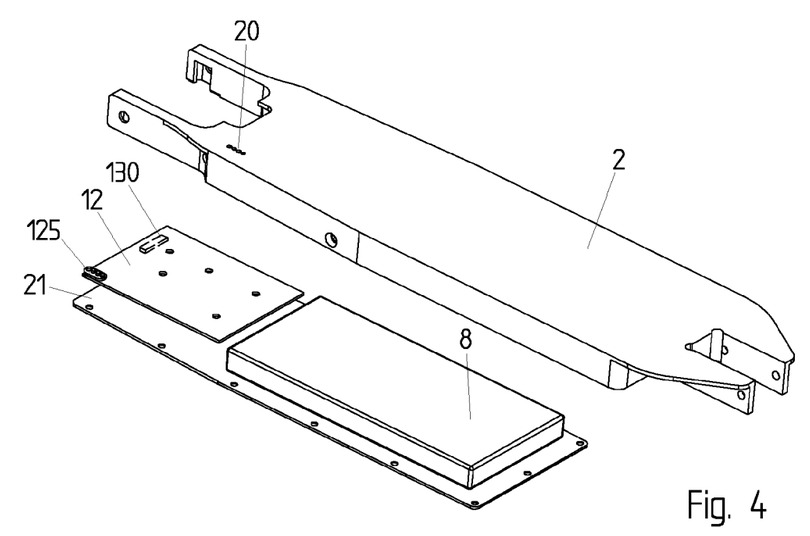
FIG. 4 is a side view of some components lodged in the deck of the scooter.

A battery pack 8 is placed within the deck 2, for example in a housing under the top surface of the deck 2. The battery pack 8 preferably comprises a set of batteries, for example lithium-ion or lithium-polymer batteries, and a battery management circuit for controlling the charge and discharge of the batteries within the pack. A drive circuit 12 comprising various electronic components on a printed circuit board is lodged in the same housing, or in a different housing, under the surface of the deck 3. The printed circuit board of the drive circuit is preferably mounted under the top surface of the deck 2, and isolated from this deck with a sheet of foam for electric isolation and shock absorption. The electronic components are preferably mounted under the lower surface of the printed circuit board, for better and faster drying if humidity enters this housing. Reference number 125 is a display, for example a set of leds, visible through openings 20 in the deck to shown the status of the battery and of the drive circuit. Reference number 130 shows a positional sensor, for example a Hall sensor, a magnetoresistive sensor, or any kind of magnetic, inductive, optical or resistive sensor for generating a signal representative of the instantaneous position of the brake pedal 14. In the illustrated example, the Hall sensor 130 within the housing in the deck 2 collaborates with a magnet 131 integral with the brake pedal 14, and generates an analog or digital signal with more than two different possible values representative of the position of the brake pedal. Reference number 21 is a plate under the deck 2 for closing the housing or housings for the battery pack 8 and drive circuit 12.

The battery pack 8 can be charged by a separate external charger connected through a connector. Other battery technology could also be used with other way of charging the battery, for instance with an integrated charger, with solar cells and/or with an external charger using contactless energy transfer. The battery pack could also be removable to be charged with an external charger and/or to be replaced by an additional/replacement battery pack.

The electronic drive circuit 12 controls the electrical supply to the stator 10 from the battery pack 8, and thus determines the speed of the scooter and at which moment electrical assistance should be provided. As can be shown on FIG. 8, this drive circuit 12 includes one microcontroller 122 which includes and executes a plurality of software modules, such as a speed sensing module 1220 for determining the speed of the scooter or the rotational speed of the wheel, a leg push determination module 1221 for determining if the user is propelling the scooter with leg pushes, an auto-power on and off module 1222, a brake control module 1223, a speed control module 1224, etc. The software can preferably be updated for better performances or adapted to the user's weight, style or drive or preferences. A new software can for example be uploaded with a memory card or through a RS232 or USB port.

Figure 8:
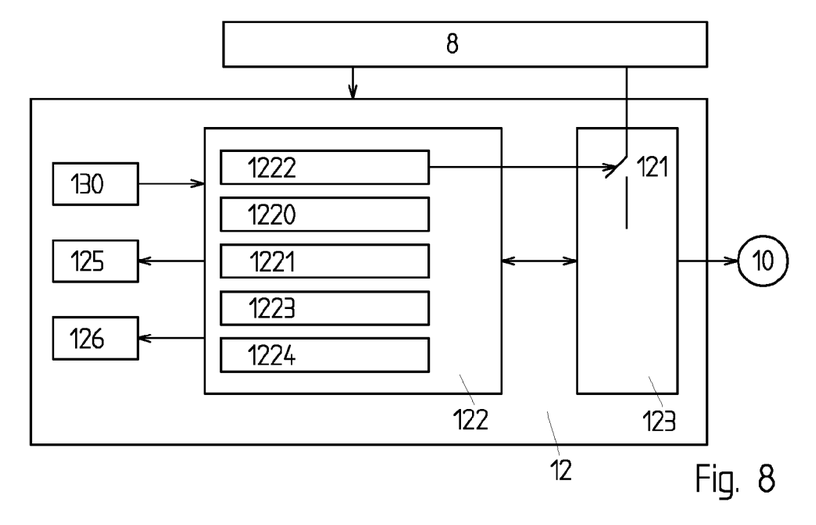
FIG. 8 is a simplified block schema of the drive circuit.

The electronic drive circuit 12 further includes an electrical motor driver 123 for power supplying the stator 10 of the motor. The motor driver 123 can comprise a plurality of power transistors controlled by a speed control module 1224 in microcontroller 122 which determines the current to apply to each phase of the stator 10 at each instant. The motor driver 123 includes at least one switch 121 for selectively disconnecting the electrical motor 10, 11 and at least some components of the electrical motor driver 123 from the battery pack 8, for example when the scooter is not used, or for connecting the motor driver 123 with the battery pack 8 during use. The switch 121 between the motor driver 123 and the battery pack 8 could be for example a power transistor and/or a relay and/or a controllable diode.

The auto-power on module 1222 can be a software module or a circuit and controls the switch 121 which is automatically switched on when a user pushes the street scooter. When the user runs/drives the scooter up to a certain speed level (by pushing with one leg), the electronic driver 123 is activated and powered using the motor back emf voltage.

The control of the electrical assistance is thus implemented with the target to be barely noticed that the scooter is electrically assisted: which means that there will be no button, no switches, no finger control, no foot control which need to be activated in order to wake the motor driver circuit from the low power mode, and then to start/stop the electrical assistance and/or to control the level of electrical assistance. The main idea is to use the normal way of driving a scooter and/or a micro scooter to start and/or control the level of electrical assistance: a push by one leg allows the user driving the scooter, setting the speed while the brake allows to stop/brake the scooter.

A hot plug circuitry/charging circuitry (not shown) can be used to control the current during the connection process. Diodes in parallel of a power transistor of a power bridge allows rectifying the motor back emf and charging a capacitor at the DC side of the power bridge to a DC voltage level allowing to wake up and supply the logic motor driver controller; using separate diode assembly and/or separate capacitor could also be possible to obtain the same result.

Once the motor driver controller 123 is up functional, the battery pack 8 can be connected to the motor driver through the switch 121. The electronic driver 123 and the microcontroller then determine from the speed profile (i.e., a series of consecutive measures of speed) if the user is propelling the scooter with a leg push; in this case, the motor driver 123 is controlled by the microcontroller 122 so as to provide electrical assistance for driving the scooter. If the microcontroller determines that the rotation of the wheel is not due to a leg push, no electrical assistance will be provided.

Power supply of the motor driver 123 is maintained up until next auto power off event. The auto-power on and off module 1222 automatically switches the switch 121 off when the scooter is not used during a predetermined duration. For example, the module 1222 disconnect at least one part of the motor driver 123, as well as the motor 10 itself, from the battery pack 8 so as to reduce the power consumption after a time out of typically 30 seconds when the wheels are not rotating and/or when no leg push is detected.

In one embodiment, only a part of the electronic driver 123 is disconnected from the battery pack 8 in power off mode, while other electronic components are still powered on. For example, in one embodiment, a wake-up circuit in the electronic driver is constantly powered on, even when the street scooter is in power off mode. The microcontroller 122 in the electronic drive circuit 12, for example a DSP, could be powered off, or put in a low power mode, when the street scooter is in power off mode; other electronic components could be maintained powered.

Auto power on/off functionalities can also be realized without a switch between the motor driver 123 and the battery pack 8 and by using a motor driver providing at least one low power mode (or standby mode) during which the motor driver selectively turns on/off part of the motor driver circuitry to reduce the motor driver consumption from the battery pack to a level low enough to reduce the discharge of the battery pack to a rate level low enough to be negligible for the application. Several low power modes can be provided.

According to one aspect of the invention, the microcontroller 122 includes a leg push determination module 1221 for detecting displacements caused by a normal use of the scooter, i.e., displacements caused by a user who pushes the scooter with his leg, and distinguishing those displacements from other displacements like when the user just walks beside the scooter. Only displacements caused by a leg push will trigger the electrical assistance and start the motor 10; other displacements, which tend to be more regular and have a different speed profile, do not cause a start of the electrical motor.

Figure 7:
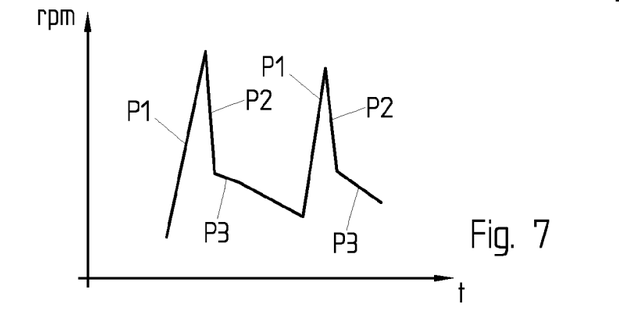
FIG. 7 is a time diagram that shows the measured rear wheel speed of a street scooter without electric assistance, i.e., leg propelled.

FIG. 7 illustrates the rotational speed in rotations per minutes of a conventional street scooter without electrical assistance, after each "leg push", the scooter speed will first increase to a certain speed level and then decrease with a "speed rate variation" which will depend on the global system friction, the slope of the road and the total weight of the user and scooter. A leg push impact on a street scooter thus produces one cycle with three consecutive phases P1, P2 and P3:

Phase 1 (P1): the scooter speed increases during leg push. During this phase, the speed of the user's body does not accelerate as much as the scooter speed;

Phase 2 (P2): the user recenters his body on the scooter, and pulls the handle bar. During this phase, the scooter speed decreases to reach the average speed of the user and the scooter together. If the user's body stands fixed to the scooter, this phase 2 will be less marked.

Phase 3 (P3): the average speed of the user and the scooter decreases from speed deceleration rate due to friction and/or the slope of the road, until the next leg push.

This cycle is repeated during normal use of the scooter, as shown on FIG. 7.

The difference of speed between the end of phase 1 and end of phase 2 is mainly due to the fact that the user's body and the scooter are not rigidly fixed together; the scooter accelerates first when the user's leg touches the street, and rapidly decelerates when the user pulls the handle bar to recenter his body on the deck of the scooter. This observation can advantageously be used by the leg push discriminating module 1221, for example as part of the software executed by the microcontroller 122 controlling the motor driver circuit 123, in order to detect and differentiate a real leg push from other activity for which the electrical assistance should not be activated: in a real leg push, phase 2 should be clearly marked, and easy to distinguish by noting a phase 2 with fast deceleration and a phase 3 with lower deceleration, while other activities are less likely to produce this phase 2. The discriminating software module 1221 run by a processor can thus determine the rate of deceleration during phase 2 and phase 3, the duration of those phases, and the difference of deceleration rates in order to determine whether the user is pushing the scooter with his leg and if electrical assistance is needed. In one embodiment, electrical assistance is only provided after several leg pushes in order to clearly determine whether this assistance is required. In another embodiment, electrical assistance is immediately started and interrupted after a few cycles if the phase 2 is not enough distinguishable or if there is a doubt about the user's activity.

There are numerous solutions/ways of implementing the electrical assistance based on the measured speed and/or measured speed variation, each solution resulting in a different user's feeling.

Electrical assistance during phase 1 ("leg push") may help to accelerate the scooter, but the acceleration of the user body may be more critical. Electrical assistance during this sequence may result in a higher "scooter after push starting speed" compare to the "user after push starting speed" unless the user find a way to stand together with the scooter during the leg push. In many situations, it is beneficial to reduce or even cancel electrical assistance during this phase.

Electrical assistance during phase 2 may help to maintain the speed level of the scooter but also help to accelerate the user's body speed up to the scooter's speed: the user will have the feeling that the scooter will pull him forward, and may have difficulties recenter his body on the deck.

Electrical assistance during phase 3 may help to maintain the speed level of the scooter but also the one of the user's body: the user will have the feeling that the scooter has less friction and/or that the road slope is becoming more flat.

In one preferred embodiment, the electrical assistance is provided mainly or only during phase 3, to reduce the deceleration during this phase and to simulate a lower friction and lower slope of the road. However, electrical assistance can be performed during all three phases:

The scooter's speed is preferably detected with a speed sensing module 1220 executed by the microcontroller 122. The speed determination may be based on signals provided by the detection unit that directly (with a sensor) and/or indirectly (sensorless) measures the speed and/or position of the wheel. Alternatively, an inertial sensor may be used for detecting the scooter's speed and acceleration. The lower weight/inertia of the scooter compared to the user's weight/inertia can advantageously be used to differentiate scooter speed variation from user's speed variation.

The electrical circuit can comprise an AD converter and/or a time capture unit for obtaining a digital signal corresponding to the rotation speed of the wheel at any time. The microcontroller 122 may also be used for determining in which of the three phases the motor is at any instant, and the level of assistance which is thus required.

The level of assistance which is provided during phase 3, and/or during the other phases, is based on a set speed which is advantageously determined after each leg push, i.e., at the end of phase 1, when or shortly after the peak of measured speed. This level of assistance is preferably determined and updated each time the user pushes to drive the scooter. The level of electric assistance might be determined with a speed control module 1224 executed by microcontroller 122 and which determines the drive signal to apply to the motor, based on the current and past measured speed, on one or a plurality of set speeds and/or on the phase of movement in which the scooter currently is.

Figure 6:
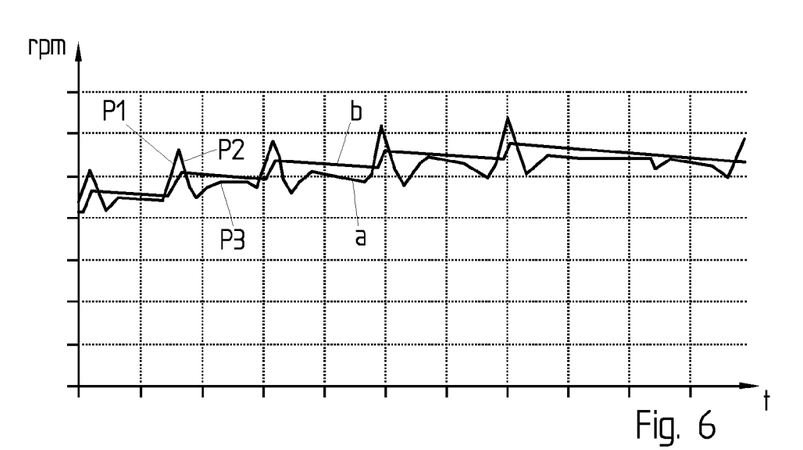
FIG. 6 is a time diagram that shows the measured rear wheel speed of a street scooter with electric assistance, i.e., leg and motor propelled, and the set value for the speed.

In one embodiment, the speed control module 1224 determines a set speed (or the speed level to be about maintained) that corresponds to the peak speed of the scooter reached immediately at the end of the leg push This embodiment is illustrated on FIG. 6 where the curve a is the measured rotational speed of the driving wheel in rotation per minutes, and curve b is a set speed for this wheel. In this example, the set speed value is calculated with the following method:

While no leg push is being detected and/or no measured speed increase is being detected, set speed value is decreased with a deceleration rate corresponding to the target artificially decreased friction feeling;

After/during a leg push and/or a measured speed becoming higher than the set speed value, the set speed value is increased up to a certain value.

In one example, the set speed is determined at the end of phase 1 based on the peak speed reached after the leg push; for example, the set speed could be equal to the maximal speed, or a fraction of this maximal speed, for example 60% or 80% of this peak speed, or have a fixed difference to this maximal speed In another embodiment, the set speed is based on the speed during or at the end of a second phase of each cycle during which the speed of the scooter rapidly decreases when the user recenters his body. In yet another embodiment, the set speed is a fraction of the speed at the end or during this second phase. In yet another embodiment, the set speed is an average, or a weighted average, between the peak speed at the end of phase 1 and the speed at the end or during phase 2. In every situation, the user can increase the set speed by pushing the scooter faster, or decrease the set speed by pushing with less intensity. A maximal set speed can be determined to avoid the risk of running too fast.

Once the set speed has been determined, the motor driver 121 tries to maintain this set speed until a new set speed has been determined. In one preferred embodiment, the motor driver will slowly, progressively decrease the set speed, applying a set speed decrease rate. The standard target resulting feeling is a scooter with extremely low friction that runs with no effort.

This feeling can be modified in function of the customer needs/wishes by modifying the way of determining/calculating the "set speed value" level after a "detected customer push" and/or by increasing/decreasing the "set speed decrease rate" after a "detected customer push". This modification can be made by replacing a firmware run by the microcontroller 122, or possibly with a command organ manipulated by the user during use.

In the described example, speed control has been applied with a set speed value and a measured speed value. Electrical assistance of a scooter could also be implemented by other approaches:

measured speed is used to detect leg push; leg push can also be detected by using an accelerometer. The integral of the acceleration rate results to a speed variation that can be used to manage the electrical assistance;

electrical assistance is applied (by applying a torque level and/or a current level and/or a voltage level and/or by maintaining a speed level) as soon as at least one leg push is detected;

the electrical assistance could be maintained while leg push are detected and/or could be suspended/reduced when no leg push has been detected during a predetermined duration;

the level of assistance could be constant and/or adapted by analyzing the evolution of the measured speed after at least one push leg push;

the assistance could be suspended and/or reduced in case the measured speed level reaches a maximal limit and/or a minimal limit.

In one embodiment, no assistance is provided when the measured speed is below a first threshold, to make sure a user can walk while pushing its scooter on its side. In one embodiment, no assistance is provided when the measured speed is above a second threshold to make sure a user will not drive too fast.

Figure 5:
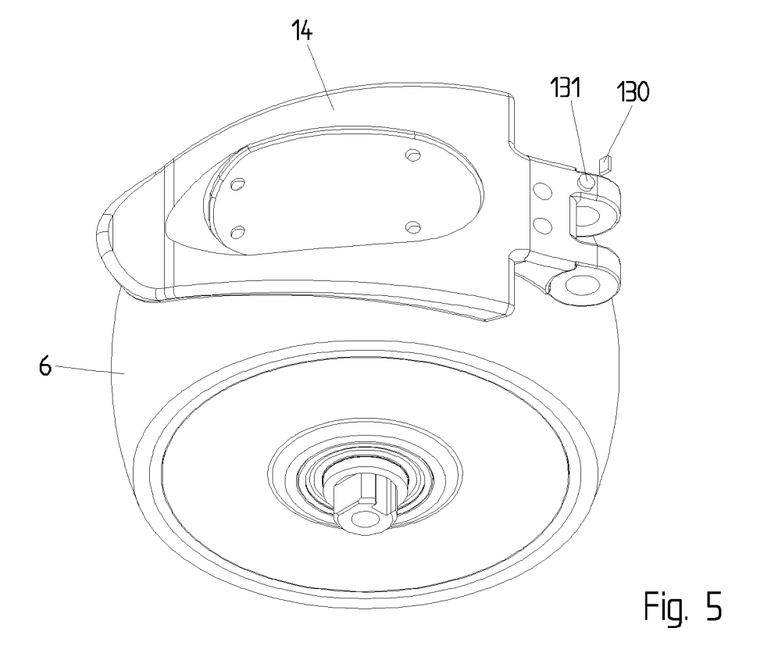
FIG. 5 is a side elevational view of the rear wheel with the brake

FIG. 5 shows a brake, here a brake pedal 14, mounted on the scooter for braking the rear wheel by friction when the brake pedal is pushed and touches the rear wheel. The brake pedal 14 comprises a magnet 131 that cooperates with a Hall or magnetoresistive sensor 130 on the printed circuit board of the drive circuit 12, so that the Hall or magnetoresistive sensor generates a brake signal that depends on the position of the brake pedal. Brake motion is detected even before a friction contact with the rear wheel. In case of brake detection, the electrical assistance is first suspended until the next detected leg push; the motor driver can also perform active braking with the motor while the rear brake stays activated.

The active braking allows a braking of the scooter using the motor generating and charging the battery pack and/or dissipating the generated power in resistors 126 in case the battery pack is full and/or does not allow to be charged. The rear brake can also be used to brake by friction on the rear wheel with a larger motion of the rear brake and a friction contact with the rear wheel.

The brake signal generated by the sensor 131 could be an analog or digital signal and can take more than two different possible values, to enable a progressive electromagnetic braking depending on the force with which the brake pedal is activated.

In one embodiment, a rear brake is used. A front brake can also be implemented; the electrical brake can be activated from front brake and/or rear brake. A brake activated by a handle on the handle bar could also be used.

A brake control module 1223 executed by the microcontroller 122 determines the level of electromagnetic braking required at each instant. In one embodiment, the level of electromagnetic braking is proportional to the position of the brake pedal. In another embodiment, the level of electromagnetic braking is proportional to the integral of the brake signal; the braking torque thus progressively increases when the brake pedal is pressed. Even if the brake signal can take more than two different possible values, for a more reliable detection of brake action, the level of electromagnetic braking maybe proportional to the duration of activation of the brake pedal and independent of the force with which this pedal is activated. It is also possible to have a braking action proportional to the derivative of the brake position, in order to brake strongly when the brake pedal is suddenly and rapidly activated. The braking action may also be dependent on the instantaneous and past position of the brake pedal (proportional-integral), or be a proportional-integral-derivative function of the position of the brake pedal. The electromagnetic braking may be activated even before the brake touches the wheel. An anti-lock braking may also be implemented for preventing the wheels from locking up (that is, ceasing rotation) and avoiding skidding.

Other methods could be considered for detecting situations where electromagnetic braking would be desirable and for braking with the motor in those situations. As already mentioned, a brake handle on the handle bar could be used, and connected over a wired or wireless connection to the drive circuit 12. In an embodiment, the brake control module 1223 brakes the motor 10,11 when the driving wheel rotates at high speed with almost no power consumption; this might indicate that the wheel is rotating in the air, or that the user is driving downhill at high speed. The brake might also be activated automatically and possibly progressively when the scooter speed exceeds a threshold value. In one embodiment, the electromagnetic braking is also activated when the user starts to brake with his foot against the ground; this situation might be detected by a sudden increase in current needed to maintain the set speed value, and/or by a sudden decrease of speed, and/or with an inertial sensor for detecting a sudden tilt of the deck of the deck 2 when the user's foot leaves the deck and brake against the ground.

Electromagnetical braking could also be used to prevent no authorized user to drive the scooter by braking and/or shortening the motor phases if the legitimate user has not been correctly identified with a key, an electronic key, a password, a biometric key etc. A built in electronic device may be mounted for allowing a Bluetooth communication with an external user's identification unit, such as an external electronic key, a portable phone, a smartphone and/or a computer to implement such identification. The user's identification can also be based on other type of integrated identification modules, such as an SD card or other memory card which can be read with a reader that also allows implementing the features described herein.

A smartphone can also be used as a display for computing and displaying various information based on information wirelessly and/or wirelessly transmitted from the electrical circuit, such as:
- monitoring of the scooter speed and/or displacement and/or battery level (for instance state of charge, open circuit voltage, . . . );
- configuration of the assistance level and the scooter features;
- various data logging and/or statistics;
- identification and/or locking feature.

REFERENCE NUMBERS

1 Handlebar
2 Deck or platform
20 Hole on the deck for LEDs
21 Plate
4 Front wheel
6 Rear wheel
8 Battery pack
10 Stator of the electrical motor
11 Rotor of the electrical motor
12 Drive circuit
121 Switch
122 Microcontroller
1220 Speed sensing module
1221 Leg push detection module
1222 Auto-power on module
1223 Brake control module
1224 Speed control module
123 Motor driver
125 Leds
126 Resistors
13 Positional sensor
130 Hall sensor
131 Magnet
14 Brake pedal
a Measured rotational speed of the driving wheel
b Set rotational speed of the driving wheel

The invention claimed is:
1. An electrically assisted street scooter, comprising:
a handlebar;
a deck;

at least one front wheel;
at least one rear wheel;
a battery pack integral with said deck;
at least one electrical motor for driving at least one of said wheels; and
a drive circuit for controlling electrical supply to said electrical motor from said battery pack, said drive circuit comprising:
  a switch for setting said drive circuit in a low power-mode, wherein said electrical motor is not powered when the switch is off, or for setting said drive circuit in a drive mode, where said electrical motor is powered when the switch is on;
  an auto-power on circuit electrically coupled with the electrical motor and the switch for automatically switching said switch on when a speed profile of the street scooter is consistent with a non-zero predetermined speed profile of the scooter comprising a first phase of acceleration of the street scooter when the user pushes it with a leg, a second phase of fast deceleration when the user pulls a handlebar of the street scooter to re-center a body of the user after a leg push, and a third phase of deceleration of the street scooter due to friction and/or street slope; and
  an auto-power off circuit electrically coupled with the electrical motor and the switch for automatically switching said switch off when at least one of the front wheel or the rear wheel is not rotating during a predetermined duration,
    wherein said auto-power on circuit is driven by one of said at least one electric motor and said battery pack.

2. The street scooter of claim 1, wherein said switch is controlled for selectively setting said drive circuit into a low power mode without entirely disconnecting said drive circuit from said battery pack.

3. The street scooter of claim 1, arranged for switching the electrical motor on or off and for determining a level of electrical assistance based on a speed of said motor.

4. The street scooter of claim 1, arranged for switching the electrical motor on or off and for determining a level of electrical assistance based on an output signal of an accelerometer.

5. The street scooter of claim 1, wherein said drive circuit comprises a speed sensing module arranged to determine a maximum speed, wherein said drive circuit is capable of reducing the speed under said maximum speed each time a user pushes the street scooter with a leg, thus simulating a street scooter that runs with lower friction and/or simulating a street scooter that runs on a lower street slope.

6. The street scooter of claim 1, wherein said drive circuit comprises a module arranged for controlling a current supplied to said electrical motor based on a speed measured when speed of the driven wheel has reached a maximum speed.

7. The street scooter of claim 1, further comprising:
one brake pedal for braking one wheel by friction when the brake pedal is pressed against this wheel; and
at least one sensor arranged for generating a brake signal which can take more than two different values depending on a position of the brake pedal,
wherein said drive circuit is arranged for controlling a braking torque applied by the electric motor to the wheel as a function of said brake signal.

8. The street scooter of claim 7, arranged for braking only with said electric motor when said brake pedal is pushed a first amount, and for braking by friction on the wheel and with said electrical motor when said brake pedal is pushed a second, larger amount.

9. The street scooter of claim 1, further comprising a speed and/or position detection module based on sensorless technology for detecting a rotation speed and/or a position of the at least one front wheel or the at least one rear wheel, wherein the electrical motor is mounted within said at least one front wheel or within said at least one rear wheel, and for powering multiple motor phases as a function of a position of a rotor.

10. The street scooter of claim 1, wherein said drive circuit is arranged for adjusting an electrical assistance during each phase as a function of a speed measured during a respective one of said phases.

11. The street scooter of claim 10, wherein said drive circuit is arranged for adjusting the electrical assistance as a function of a speed determined during or at an end of a respective one of said phases.

12. The street scooter of claim 1, wherein said drive circuit is arranged for determining a peak speed reached after a leg push and for adjusting an electrical assistance as a function of this peak speed reached after a leg push.

13. The street scooter of claim 1, wherein said drive circuit comprises a leg push determination module for differentiating between motion due to a leg push and motion due to other activities for which the electrical assistance should not be activated.

14. The street scooter of claim 13, wherein said drive circuit comprises a speed sensing module for sensing a speed of said scooter, said leg push determination module is arranged for determining based on a speed profile whether motion is caused by a leg push or by other motions.

15. The street scooter of claim 1, further comprising a user identification system, and wherein said drive circuit is arranged for braking said electrical motor when the user has not been identified.

16. A method for driving an electrical street scooter, the electrical street scooter comprising:
a battery pack;
at least one electric motor; and
a drive circuit comprising a switch and an auto-power on circuit, the method comprising:
  automatically switching said switch on when a speed profile of the street scooter matches a non-zero predetermined speed profile of the street scooter comprising a first phase of acceleration of the street scooter when the user pushes it with a leg, a second phase of fast deceleration when the user pulls a handlebar of the street scooter to recenter a body of the user after a leg push, and a third phase of deceleration of the street scooter due to friction and/or street slope so as to power the at least one electrical motor; and
  automatically switching said switch off in response to at least one of the front wheel or the rear wheel not rotating during a predetermined duration;
wherein said auto-power on circuit is driven by one of said at least one electric motor and said battery pack.

17. The method of claim 16, further comprising:
measuring a speed of said scooter and/or a rotational speed of a wheel of said scooter;
using said speed and/or rotational speed to determine whether the scooter is leg propelled or if it moves for other reasons; and
switching said switch on only if it is determined that the scooter is leg propelled.

18. The method of claim 16, further comprising:
switching a drive circuit from a first power mode to a second power mode when said electrical motor generates a current;
determining with said drive circuit in said second power mode whether the scooter is leg propelled or if the motor turns for other reasons; and
switching said switch on only if it is determined that the scooter is leg propelled.

19. The method of claim 18, wherein switching a drive circuit in a second power mode comprises powering on a microcontroller, said microcontroller being used for determining based on a sequence of measured speed values phases during which the scooter is leg propelled.

* * * * *